(12) United States Patent
Thompson et al.

(10) Patent No.: US 10,107,059 B2
(45) Date of Patent: Oct. 23, 2018

(54) STAB CONNECTOR AND METHOD OF USE THEREOF

(71) Applicant: Forum Energy Technologies (UK) Limited, Aberdeen (GB)

(72) Inventors: John Thompson, Newcastle upon Tyne (GB); Paul Chubbock, Newcastle upon Tyne (GB)

(73) Assignee: FORUM ENERGY TECHNOLOGIES (UK) LIMITED, Aberdeen (GB)

( * ) Notice: Subject to any disclaimer, the term of this patent is extended or adjusted under 35 U.S.C. 154(b) by 123 days.

(21) Appl. No.: 14/375,090

(22) PCT Filed: Oct. 12, 2012

(86) PCT No.: PCT/GB2012/052536
§ 371 (c)(1),
(2) Date: Jul. 28, 2014

(87) PCT Pub. No.: WO2013/114065
PCT Pub. Date: Aug. 8, 2013

(65) Prior Publication Data
US 2015/0001426 A1    Jan. 1, 2015

(30) Foreign Application Priority Data

Jan. 31, 2012 (GB) .................................. 1201648.1

(51) Int. Cl.
*F16L 35/00* (2006.01)
*E21B 33/038* (2006.01)
*F16L 1/26* (2006.01)

(52) U.S. Cl.
CPC .............. *E21B 33/038* (2013.01); *F16L 1/26* (2013.01)

(58) Field of Classification Search
CPC .................................. F16L 1/26; E21B 33/038
(Continued)

(56) References Cited

U.S. PATENT DOCUMENTS 4,695,190 A * 9/1987 Best ...................... F16L 37/002
405/169
6,106,026 A * 8/2000 Smith, III ................. F16L 1/26
285/84

(Continued)

FOREIGN PATENT DOCUMENTS

| GB | 2433656 A | 6/2007 |
|---|---|---|
| WO | 98/39548 A1 | 9/1998 |
| WO | 07/86753 A1 | 8/2007 |

OTHER PUBLICATIONS

International Search Report and Written Opinion, PCT/GB2012/052536, dated Mar. 19, 2014.

*Primary Examiner* — Basil S Katcheves
*Assistant Examiner* — Joshua K Ihezie
(74) *Attorney, Agent, or Firm* — Patterson + Sheridan, L.L.P.

(57) ABSTRACT

A stab connector for providing a fluid flow path between a first fluid reservoir and a second fluid reservoir, comprising a stab body coupleable to a receptacle in fluid communication with the second fluid reservoir and moveable inside the receptacle between a sealing position, in which fluid flow in the fluid flow path between the first fluid reservoir and the second fluid reservoir is prevented, and a flow position, in which the fluid flow in the fluid flow path between the first fluid reservoir and the second fluid reservoir is permitted.

16 Claims, 9 Drawing Sheets

(58) Field of Classification Search
USPC .......................................................... 285/38
See application file for complete search history.

(56) References Cited

U.S. PATENT DOCUMENTS

2007/0184683 A1* 8/2007 Barber ...................... F16L 1/09
                                                                               439/74
2010/0209198 A1* 8/2010 Piper ..................... F16L 27/093
                                                                               405/170
2015/0136408 A1* 5/2015 Wright .................. F16L 37/086
                                                                               166/344

* cited by examiner

STAB CONNECTOR AND METHOD OF USE THEREOF

The present invention relates generally to the field of connection devices, and in particular to a "hot stab" connector for use in underwater applications. Even more particularly, the present invention relates to underwater stab connections and its operation using remotely operated vehicles (ROV).

INTRODUCTION

Subsea stab connectors (also known as "hot stabs") are commonly used to connect underwater piping or other equipment in order to temporarily supply/transfer fluid from one reservoir (e.g. a fluid tank on a boat, platform or surface, but also subsea tanks) to one or more subsea reservoirs (e.g. pipes, tanks, manifolds). Typical applications for stab connectors may be for subsea pigging, chemical injections, gas injections, flooding and venting operations.

The physical act of inserting a stab connector into a receptacle of the subsea reservoir is usually performed by divers or Remotely Operated Vehicles (ROV), depending on the depth at which the subsea reservoir is located.

Stab connections currently available simply consist of a male stab connector and its matching female receptacle, wherein the male stab connector and the female receptacle form an open fluid pathway between the two reservoirs when the male stab connector is inserted and engaged with the female receptacle. Since many subsea reservoirs or other facilities are located at depths inaccessible to human divers, the stab connector often provides means for manipulation by an ROV, i.e. a handle.

Figure 1:
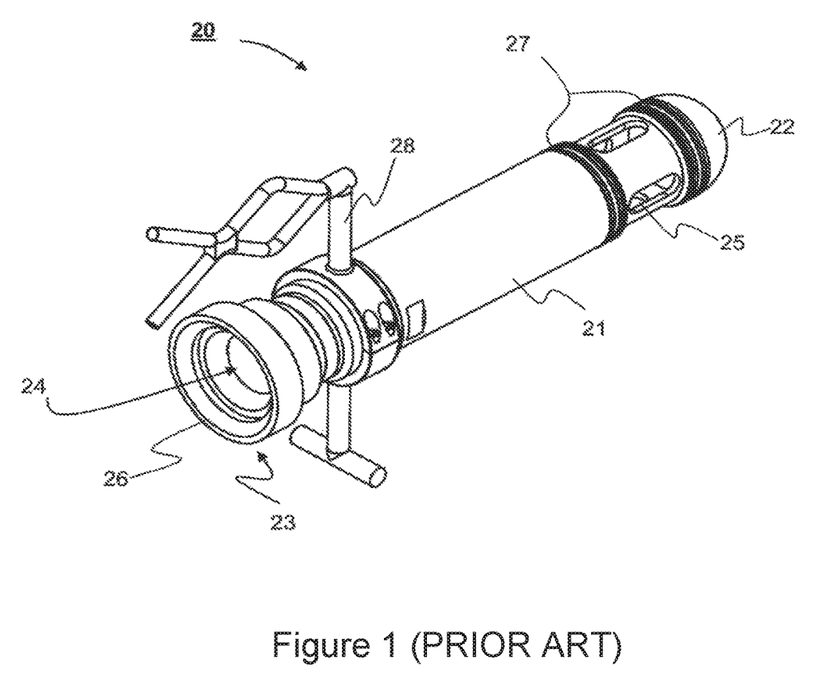
FIG. 1 shows a known "standard" stab connector having a fluid passageway.
Figure 2:
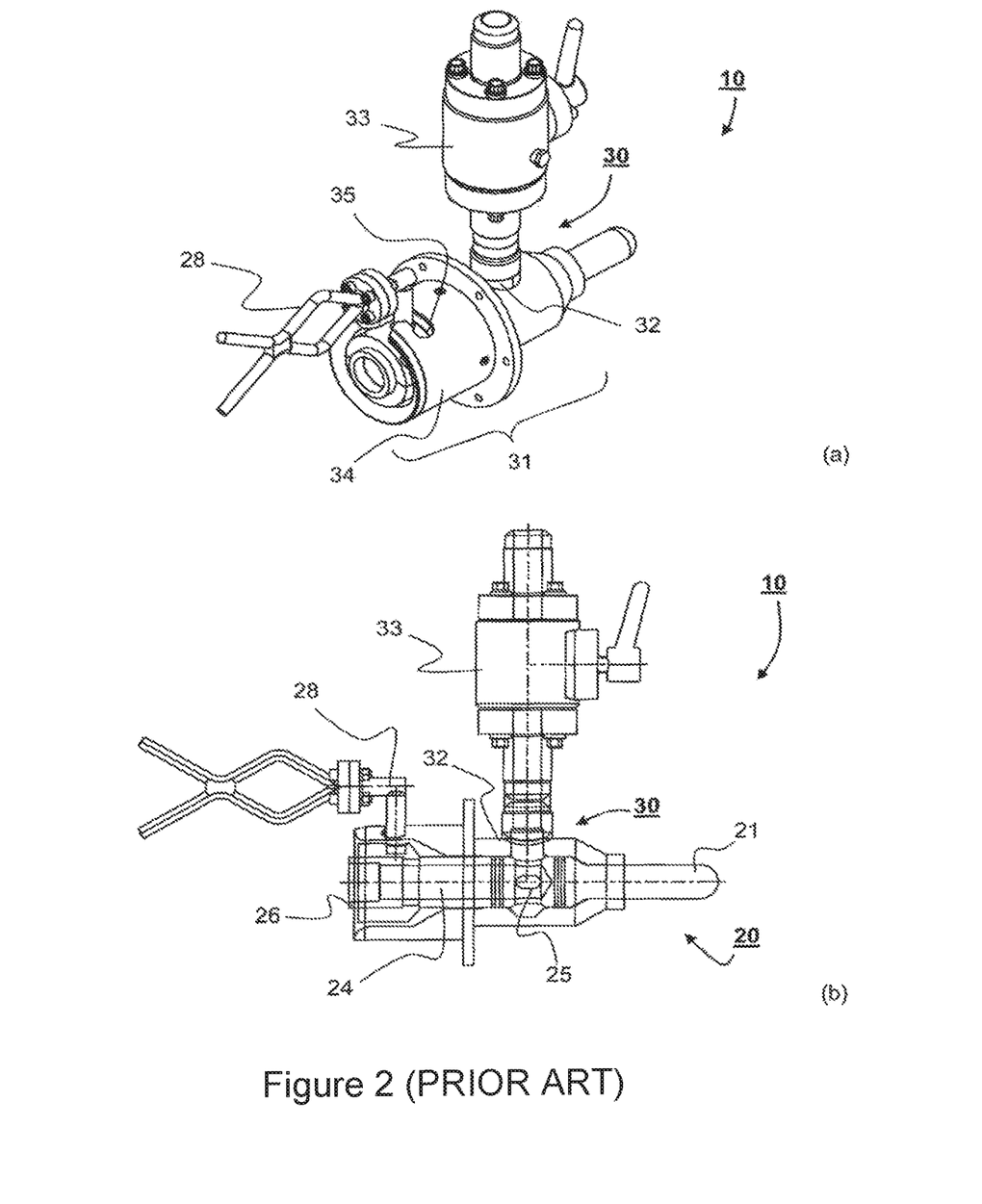
FIG. 2 shows an example of a known stab connection assembly of the stab connector of FIG. 1, a matching receptacle and a control valve in (a) perspective view and (b) sectional side view.

A typical subsea stab connection 10 and a "standard" stab connector 20 are depicted in FIGS. 1 and 2. FIG. 1 shows a "standard" stab connector 20 having an elongated stab body 21 with a distal tip portion 22 and a proximal end portion 23. The stab body 21 further provides a fluid passageway 24 between a plurality of stab connector port openings 25 and a hose port opening 26. The "standard" stab connector 20 is further provided with a seal arrangement 27 on either side of the stab connector port openings 25 so as to isolate and fluidly seal the stab connector port openings 25 and its fluid passageway 24 when in engagement with a receptacle 30 (FIG. 2). A handle portion 28 is provided at the proximal end portion 23 of the stab body 21 allowing, for example, an ROV to manipulate the male stab connector 20 during deployment in a receptacle 30.

FIG. 2 shows (a) a perspective view and (b) a sectional side view of a stab connection 10, where the "standard" stab connector 20 is deployed in and engaged with the receptacle 30 (reservoirs and hose are not shown). The receptacle 30 has a stab receiving portion 31 that includes a fluid passageway port 32 in fluid communication with a control valve 33. The control valve 33 is further in fluid communication with the subsea reservoir (not shown) and configured to open and close the fluid passageway between the reservoirs (not shown). The receptacle 30 further comprises a mounting flange 34 having a slot 35 that is configured to lockably engage with the handle portion 28 of the stab connector 20.

During operation, the ROV grabs the handle portion 28 and pushes the "standard" stab connector 20 into the receiving portion 31 of the receptacle 30, guiding the handle portion 28 into the slot 35 and locking it into place. After the handle portion 28 is correctly secured in the slot 35, the stab connector port openings 25 and the fluid passageway port 32 of the receptacle 30 are aligned so as to form a fluid passageway between the two reservoirs. The sealing portions 27 are engaged with the inner surface of the receptacle receiving portion 31 so that the fluid passageway is isolated and fluidly sealed from its surroundings. The ROV then disengages from the handle portion 28 and engages the previously closed control valve 33 in order to open the fluid path between the two reservoirs. After completing the fluid exchange, the ROV closes the control valve 33 and engages the handle portion 28 of the stab connector 20 to unlock and remove the "standard" stab connector 20 from the receptacle 30.

It is evident that the multiple engagement/disengagement operations of the ROV require considerable time and skill to first establish a connection and then operate the control valve to open/close the fluid passageway. Since all subsea activities entail significant costs and investment, every minute saved may result in considerable cost savings.

Also, any one of the connector parts (i.e. receptacle receiver, control valve, stab connector seals) may be damaged during operation or succumb to wear and tear in the harsh subsea environment, therefore requiring the recovery of the whole apparatus either for replacement or repair, causing considerable costs for the retrieval, repair and/or replacement as well as the actual downtime of the facility. For example, employing a surface vessel may cost up to £200,000 per day and the cost for a subsea ball valve may be in the region of £10,000 to £20,000.

Accordingly, it is an object of the present invention to provide a stab connector and a method of use that requires a minimum number of engagements and/or manoeuvres to deploy the connector and operate the fluid connection. It is a further object of the present invention to provide a stab connector providing improved ease of use and allowing repair and/or replacement taking a reduced length of time over known apparatus.

SUMMARY OF THE INVENTION

Preferred embodiments of the invention seek to overcome one or more of the disadvantages of the prior art.

According to a first aspect of the present invention, there is provided a stab connector for providing a fluid flow path between a first fluid reservoir and a second fluid reservoir, comprising a stab body coupleable to a receptacle in fluid communication with the second fluid reservoir and moveable inside said receptacle between a sealing position, in which fluid flow in the fluid flow path between the first fluid reservoir and the second fluid reservoir is prevented, and a flow position, in which the fluid flow in the fluid flow path between the first fluid reservoir and the second fluid reservoir is permitted.

This provides the advantage that a single stab connector can be used to not only fluidly connect two reservoirs but also control the fluid flow between the two reservoirs with a single engagement of the ROV. In particular, a control valve is no longer needed to open and close the fluid flow when establishing a fluid connection between reservoirs, because the stab connector of the present invention allows an operator to selectively open and close the fluid passageway from the receptacle to the subsea reservoir. The stab connector of the present invention provides the further advantage that, for example, the ROV (or diver) only has to engage the stab connector in order to establish the connection and selectively open and close the fluid path. There is no need to disengage the stab connector and engage with another device (e.g. control valve), therefore, saving considerable operation time and further minimizing the risk of causing damage during operation.

The stab body may be lockable in said sealing position and/or said flow position. Advantageously, the stab body may be an elongate member having a proximal end portion adapted to be fluidly coupled to the first reservoir and a distal end portion adapted to be received by the receptacle. Even more advantageously, the stab body may further comprise a sealing portion located at said distal end portion of said elongate member and adapted to fluidly seal said fluid flow path when said stab body is in said sealing position. Preferably, the sealing portion may comprise at least a first sealing member and a second sealing member. The first sealing member and the second sealing member are preferably arranged so as to seal the fluid flow path and to prevent fluid flow therethrough when the stab body is in the first sealing position.

In a first arrangement of the first aspect, the stab body may further comprise a throughbore providing a fluid passageway having at least one first opening at said distal end portion and a second opening at said proximal end portion. Preferably, the at least one first opening is coupleable in fluid communication with the receptacle, and wherein said second opening is coupleable in fluid communication with the first fluid reservoir.

Preferably, the at least one first opening may be arranged in the circumferential surface of the stab body.

This provides the advantage that the fluid passageway is formed directly through the stab connector. The second opening may be connected to a hose, or similar, so that the exchange fluid is always isolated from the environment, such as, for example, the open sea, therefore, minimizing the risk of contaminating the environment with the exchange fluid due to any leaks.

The at least one first opening may be located proximate and adjacent to said sealing portion. Advantageously, the stab body may further comprise a third sealing member arranged so as to fluidly isolate said at least one first opening in cooperation with any one of said first and/or second sealing member. Preferably, the throughbore may be adapted to provide fluid communication between the first reservoir and the second reservoir when said stab body is in said flow position.

In embodiments wherein the stab connector comprises first, second and third sealing members, the sealing portion of the stab connector isolates and seals off the fluid output port of the receptacle from the interior of the receptacle in any one of the two positions, ensuring a fluid tight seal in its closed position as well as in its open position. Therefore, all pressure forces remain within the fluid passageway through the stab connector preventing any net forces acting along the longitudinal axis of the stab connector or the retaining mechanism (i.e. J slot) and allowing the stab connector to be disconnected under pressure in the event of an emergency.

The stab connector may further comprise an engaging member adapted to lock said stab body in said sealing position and said flow position. Furthermore, the engaging member may be adapted to lock said stab body in a transitional position between said sealing position and said flow position. Advantageously, the transitional position may be a partly open flow position. This provides the advantage that the stab connector can be used as a throttle to limit the flow between the fluid reservoirs to a predetermined flow rate.

The engaging member may be located at said proximal end portion of said elongate member. Preferably, the engaging member may comprise a handle portion adapted to be manipulated by a remotely operated vehicle.

This provides the advantage that it will be possible to handle/manipulate the stab connector via an ROV. The engaging member may be of any shape suitable for manipulation with an ROV, allowing the ROV to simply "grab" the stab connector, guide it into the receptacle and selectively lock it into any one of the sealing position and flow position without having to disengage and re-engage any other part of the stab connection.

The stab body may be a sleeve engageable with at least one "standard" stab connector comprising a throughbore providing a fluid passageway, and wherein the assembly of said stab body and said "standard" stab connector is moveable inside the receptacle between said sealing position and said flow position.

This provides the advantage that any "standard" stab connector (i.e. currently known stab connector) can be retro-fitted with the stab connector of the present invention in order to be used with a matching receptacle.

Alternatively, a receptacle may be permanently retro-fitted with the stab connector of the present invention in order to allow the use of "standard" stab connectors and selectively provide a sealing position and a flow position of the stab/sleeve assembly within the receptacle. Furthermore, the retro-fitted sleeve provides the advantage that it can be easily and cost effectively replaced and/or repaired in the event of damage or wear.

The stab body may further comprise a stab engaging flange adapted to operatively engage said at least one "standard" stab connector and said stab body.

In a second arrangement of the first aspect, the stab connector may further comprise a linear throughbore along the longitudinal axis of the stab body having a first opening at the proximal end portion and a second opening at the distal end portion.

Preferably, the sealing portion may comprise at least a first sealing member and a second sealing member.

Advantageously, the stab connector may further comprise an engaging member adapted to lock said stab body in said sealing position and said flow position. Advantageously, the engaging member may be located at said proximal end portion of said elongate member. Preferably, the engaging member comprises a handle portion adapted to be manipulated by a remotely operated vehicle.

This provides the advantage that fluid can flow into the surrounding environment either directly from the receptacle outlet or through the stab body.

According to a second aspect of the present invention, there is provided a receptacle for providing a fluid flow path between a first fluid reservoir and a second fluid reservoir, comprising a receptacle body in fluid communication with the second fluid reservoir and adapted to receive a stab connector in a sealing position, in which fluid flow in the fluid flow path between the first fluid reservoir and the second fluid reservoir is prevented, and a flow position, in which fluid flow in the fluid flow path between the first fluid reservoir and the second fluid reservoir is permitted.

Advantageously, the receptacle body may further comprise a flange portion adapted to engage an engaging portion of said stab connector.

Even more advantageously, the flange portion may comprise a slot configured to provide a first position and a second position and a transitional position therebetween for said engaging portion of said stab connector. Even more advantageously, the slot is in the form of a J-slot. The J-slot preferably comprises a first position, a second position and a transitional position. In the first position, the stab connector is locked in the sealing position and in the second position, the stab connector is locked in the flow position. The transitional position is a position anywhere between the first and the second position.

Preferably, the stab connector may be a stab connector according to the first aspect of the invention.

According to a third aspect of the present invention, there is provided a method of controlling fluid flow between a first fluid reservoir and a second fluid reservoir, the method comprising the steps of:

(a) providing a fluid flow path between said first fluid reservoir and said second fluid reservoir;

(b) inserting a stab connector into said fluid flow path, (c) securing said stab connector in a sealing position so as to prevent fluid flow between the first fluid reservoir and the second fluid reservoir;

(d) moving said stab connector into a flow position within said fluid flow path so as to permit fluid flow between the first fluid reservoir and the second fluid reservoir.

The method may further comprise the step of:

(e) moving said stab connector back into said sealing position within said fluid flow path so as to terminate fluid flow between the first fluid reservoir and the second fluid reservoir.

This provides the advantage that, for example, the ROV only needs to engage the stab connector to deploy the stab connector within the fluid flow patch and operate the fluid flow between the first and second fluid reservoirs, therefore minimizing operation time and costs.

The stab connector may be a stab connector according to the first aspect of the invention.

The receptacle may be a receptacle according to the second aspect of the invention.

Preferably, the stab body may be deployed in said receptacle prior to step (a).

This provides the advantage that a "standard" stab connector can be used with the retro-fitted receptacle so that the assembly if capable of controlling the fluid flow between the reservoirs (i.e. open/close).

When the stab body comprises a sleeve, the stab body may remain deployed in said receptacle subsequent to step (e).

This provides the advantage that the sleeve can be used as a removable seal for the second reservoir preventing any leakage when not in fluid communication with a first reservoir.

According to a fourth aspect of the present invention, there is provided a stab connector operable to control fluid flow through a fluid flow path between a first fluid reservoir and a second fluid reservoir, comprising a stab body deployable in said fluid flow path and having a first sealing portion engageable with a first sealing surface and operable to prevent fluid flow along said fluid flow path when engaged with the first sealing surface.

The stab body may have a second sealing portion engageable with the first sealing surface and operable to allow a fluid flow along said fluid flow path when engaged with the first sealing surface.

Advantageously, the first sealing portion may be engageable with a second sealing surface and may be operable to allow fluid flow along said fluid flow path when engaged with the second sealing surface.

BRIEF DESCRIPTION OF THE DRAWINGS

A preferred embodiment of the present invention will now be described, by way of example only and not in any limitative sense, with reference to the accompanying drawings, in which.

DETAILED DESCRIPTION OF EMBODIMENTS

Figure 3:
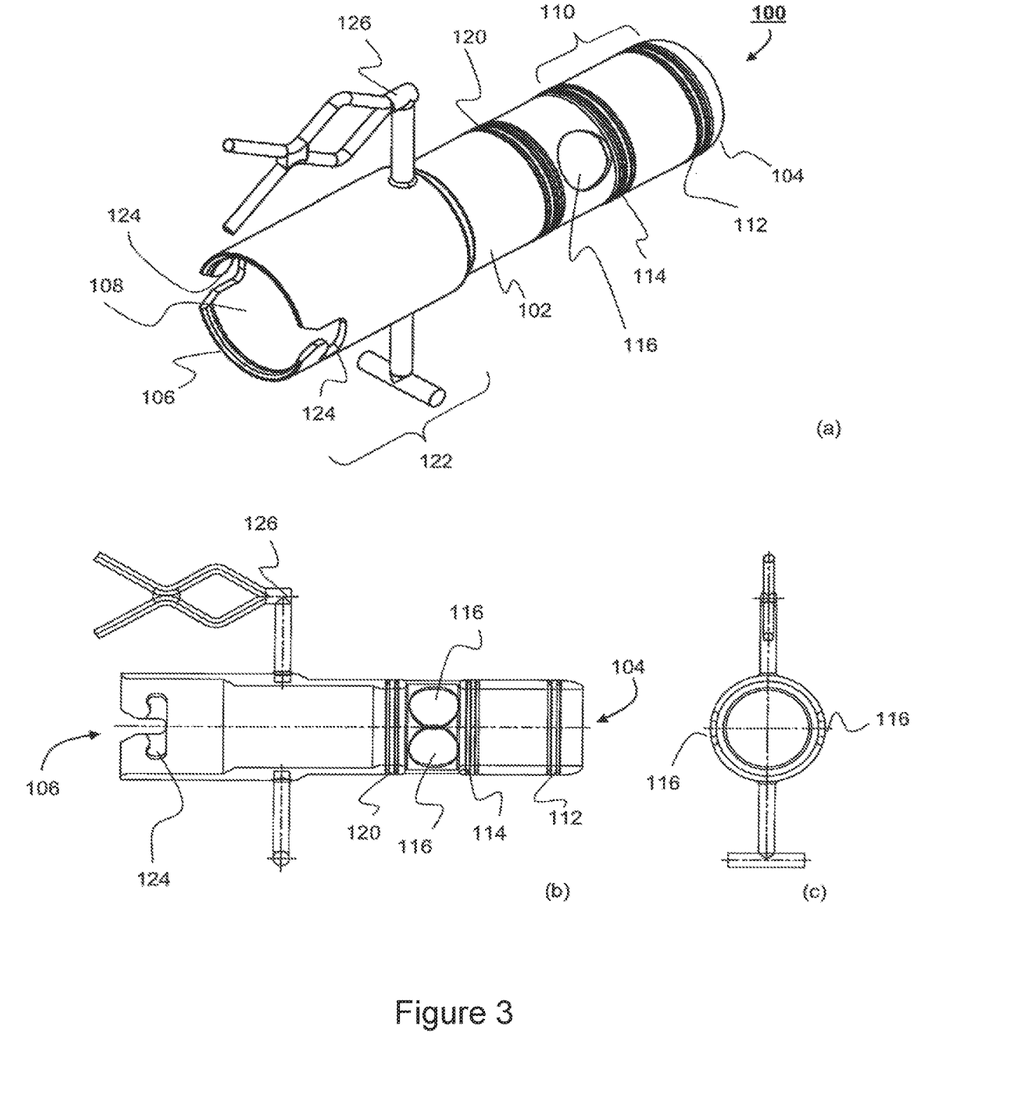
FIG. 3 shows (a) a perspective view, (b) a sectional side view and (c) a front view of the preferred embodiment of the stab connector of the present invention.
Figure 4:
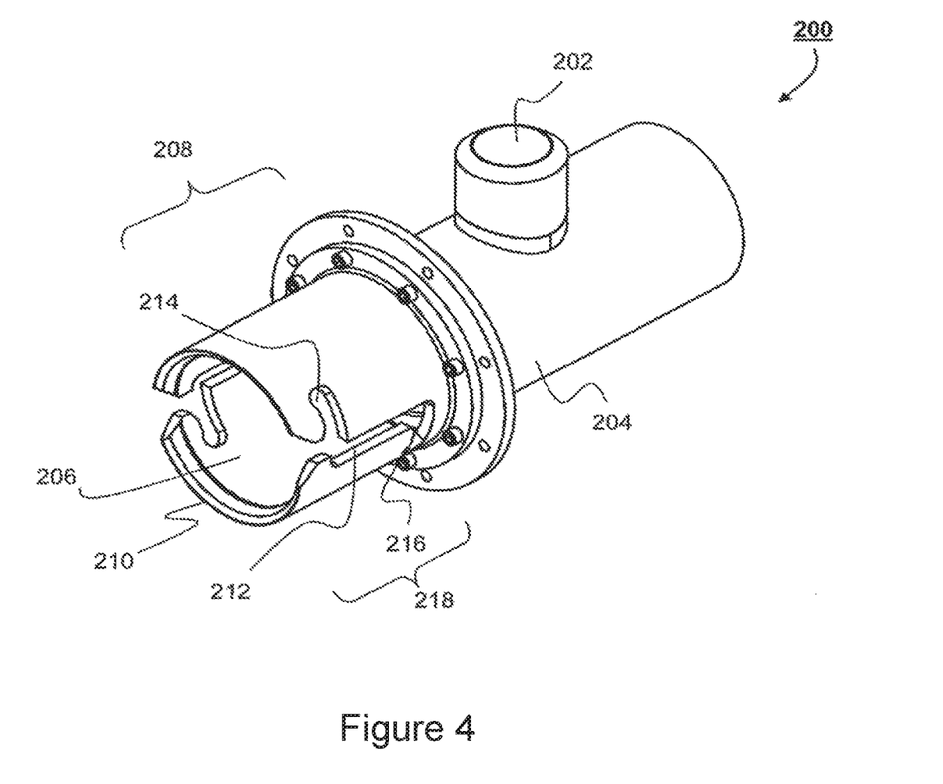
FIG. 4 shows a receptacle configured to operatively receive the stab connector of FIG. 3.

In accordance with the preferred embodiment of the present invention, FIG. 3 (a) depicts a stab connector 100 in form of a sleeve retro-fittable to a known "standard" stab connector 20 (see FIGS. 1 and 2) or a matching receptacle 200 (see FIG. 4).

The stab connector 100 of the preferred embodiment includes an elongated stab body 102 in form of a hollow cylinder. The stab body 102 has a distal end portion 104, a proximal end portion 106 and a central bore 108.

A sealing portion 110 is arranged at the distal end portion 104 of the stab body 102. The sealing portion 110 includes a first seal 112 and a second seal 114, each provided on the outer surface of the stab body 102. The second seal 114 is spaced apart from the first seal 112 in a direction towards the proximal end portion 106, wherein the space covered by the first and second seal 112, 114 is such that it provides a fluid tight seal with the inner surface of the stab body 102 upon engagement with the outlet port 202 of a receptacle 200 (see FIG. 5 (b)). Preferably, first and second seals 112, 114 are one or more composite seals. In particular, the composite seal is an assembly of an energizing element such as a silicon rubber O-ring coaxially surrounded by a sealing element such as a PTFE glide ring. In this particular arrangement, the elastic O-ring acts as a spring element that presses the PTFE glide ring against the surface to be sealed.

Alternatively, the seals may be provided by piston seals disposed in grooves arranged within the outer surface of the stab body 102. The piston seals may be manufactured from elastomer or thermoplastic. However, it is understood by the skilled person in the art that any sealing means that is suitable to seal off the fluid path of the outlet port 202 of the receptacle 200 may be used instead of the described examples of composite seals or piston seals 112, 114.

The stab body 102 further includes two central bore exit ports 116 located proximal to the sealing portion 110 and on radially opposite sides of the stab body 102. The two exit ports 116 are arranged such that the plurality of stab connector port openings 25 of an engaging "standard" stab connector 20 are aligned with the exit ports 116 so as to form a fluid path into the "standard" stab fluid passageway 24 when the "standard" stab connector 20 is engaged and secured with the stab body 102.

Furthermore, the stab body 102 includes a third seal 120 provided on the outer surface of the stab body 102 and spaced apart from the second seal 114 towards the proximal end portion 106. The third seal 120 and the second seal 114 are configured so as to seal the fluid path through the stab connector port openings 25, exit ports 116 and outlet port 202 from its surroundings upon engagement with the inner surface of the receptacle 200 (see FIG. 6 (b)).

A flange portion 122 is provided at the proximal end portion 106 of the stab body 102. The flange portion 122 includes a pair of single-position J-slots 124 that are configured to receive and engage the "standard" stab connector handle 28. When the "standard" stab connector handle 28 is inserted into the J-slots 124 and rotated about the longitudinal axis of the stab body 102, the "standard" stab connector 20 is locked in the stab connector 100 so that the J-slots 124 prevent the accidental removal of the "standard" stab connector 20 from the stab connector 100.

Furthermore, the J-slots 124 provide visual assurance that the "standard" stab connector 20 is correctly engaged within the stab connector 100, i.e. the stab connector port openings 25 of the known "standard" stab connector 20 and the exit ports 116 of the stab body 102 are aligned.

A handle portion 126 is provided in a region towards the proximal end portion 106 of the stab body 102. The handle portion 126 is configured to engage with the multi-position slot 212 of the receiving receptacle 200 (see FIG. 4). For example, the multi-position slot may be a J-slot configured to provide a first proximal position 214, a second distal position 216 as well as a transitional position 218 therebetween. In the first proximal position 214, the stab connector 100 is in the sealing position, in the second position 216, the stab connector 100 is in the flow position, and in the transitional position 218, the stab connector 100 is moved between the first and the second position 214, 216, respectively.

Alternatively, additional slots (not shown) may be provided in the region of the multi-position J-slot when in the transitional position 218. Thus, the handle portion 126 can be locked in any one of the additional slots when in the transitional position 218 to provide a partly open flow position. Therefore, the stab connector 100 may be utilized as a throttle providing a predetermined flow rate between the connected fluid reservoirs.

In yet another alternative arrangement, the sealing position, the flow position and any multiple transitional positions therebetween may be provided seamlessly by a screw thread mechanism.

Preferably, the handle portion 126 is configured to be manipulated by an ROV. The handle portion 126 may be of 'fish-tail' design. However, it is understood by the skilled person in the art that many suitable handle portion designs are possible. Typical known designs include, for example, 'fish-tail', 'T-bar' and 'D-type' handles, but other types such as 'paddle', 'goal-post', 'circular' or 'inline-pull' are also considered suitable for the stab connector 100 of the present invention.

Referring now to FIG. 4, a receptacle 200 is depicted that is suitable to engage with the stab connector 100 so as to provide a selectively controllable fluid path between two reservoirs (e.g. subsea reservoir and above surface reservoir).

The receptacle 200 includes a tubular body 204 having a central throughbore 206 and an outlet port 202 in fluid communication with the subsea reservoir (not shown). The tubular body 204 further includes a flange portion 208 on the stab-receiving end 210 of the tubular body 204. The flange portion 208 includes a J-slot 212 configured to provide a first proximal position 214, a second distal position 216 as well as a transitional position 218 therebetween for the handle portion 126 of the stab connector 100. The dimensions of the central throughbore 206 are such that a tight fit is provided for the matching stab connector 100. The flange portion 208 may be removably coupled to a "standard" receptacle, i.e. replacing the original flange portion of the "standard" receptacle 30 in order to accommodate for the at least two positions of the stab connector 100.

Figure 5:
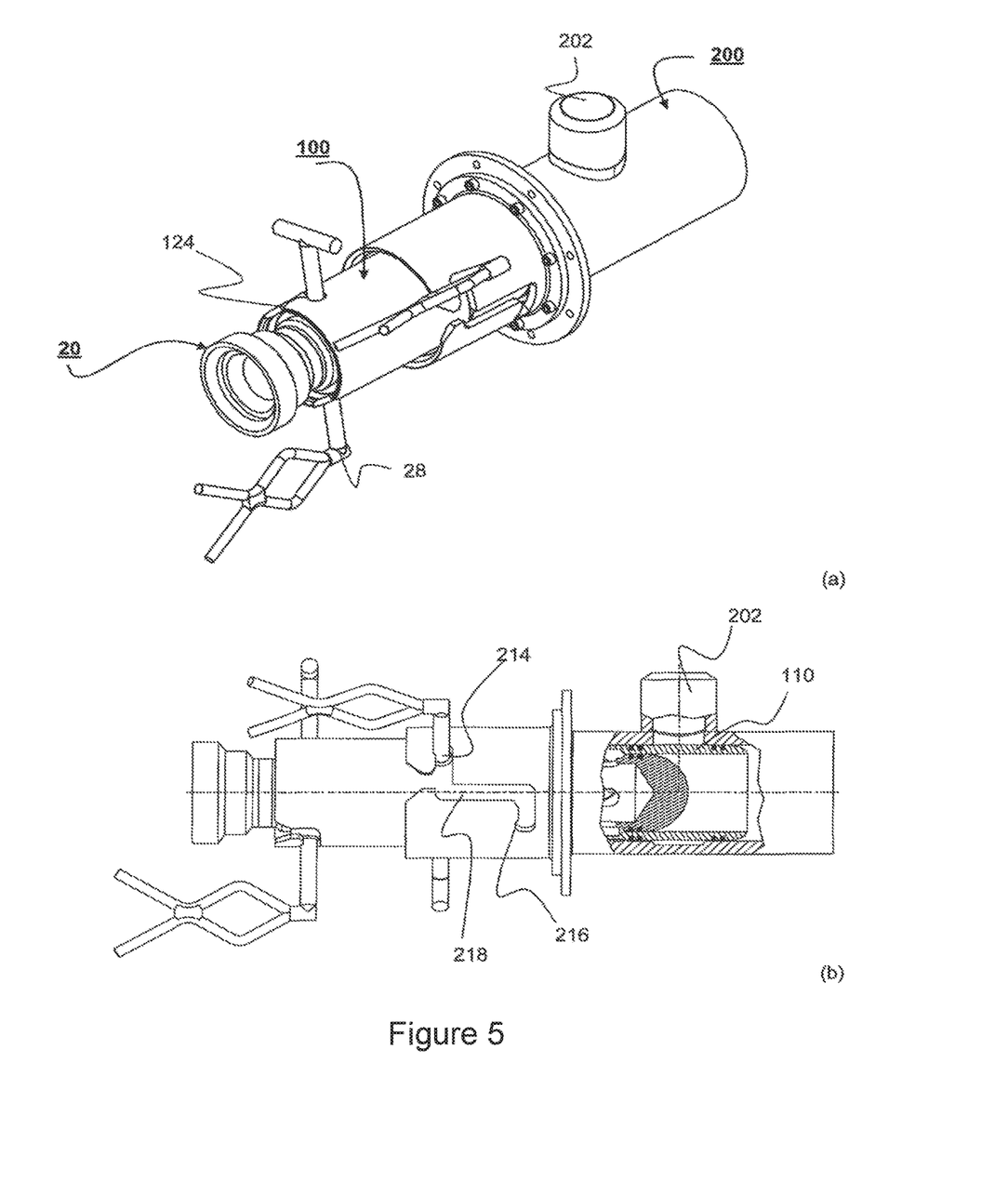
FIG. 5 shows the assembly of the "standard" stab connector of FIG. 1, the preferred embodiment of the stab connector of FIG. 3, and the receptacle of FIG. 4 in (a) a perspective view and (b) in a partially sectioned side view, when the stab connector is in its sealing position.
Figure 6:
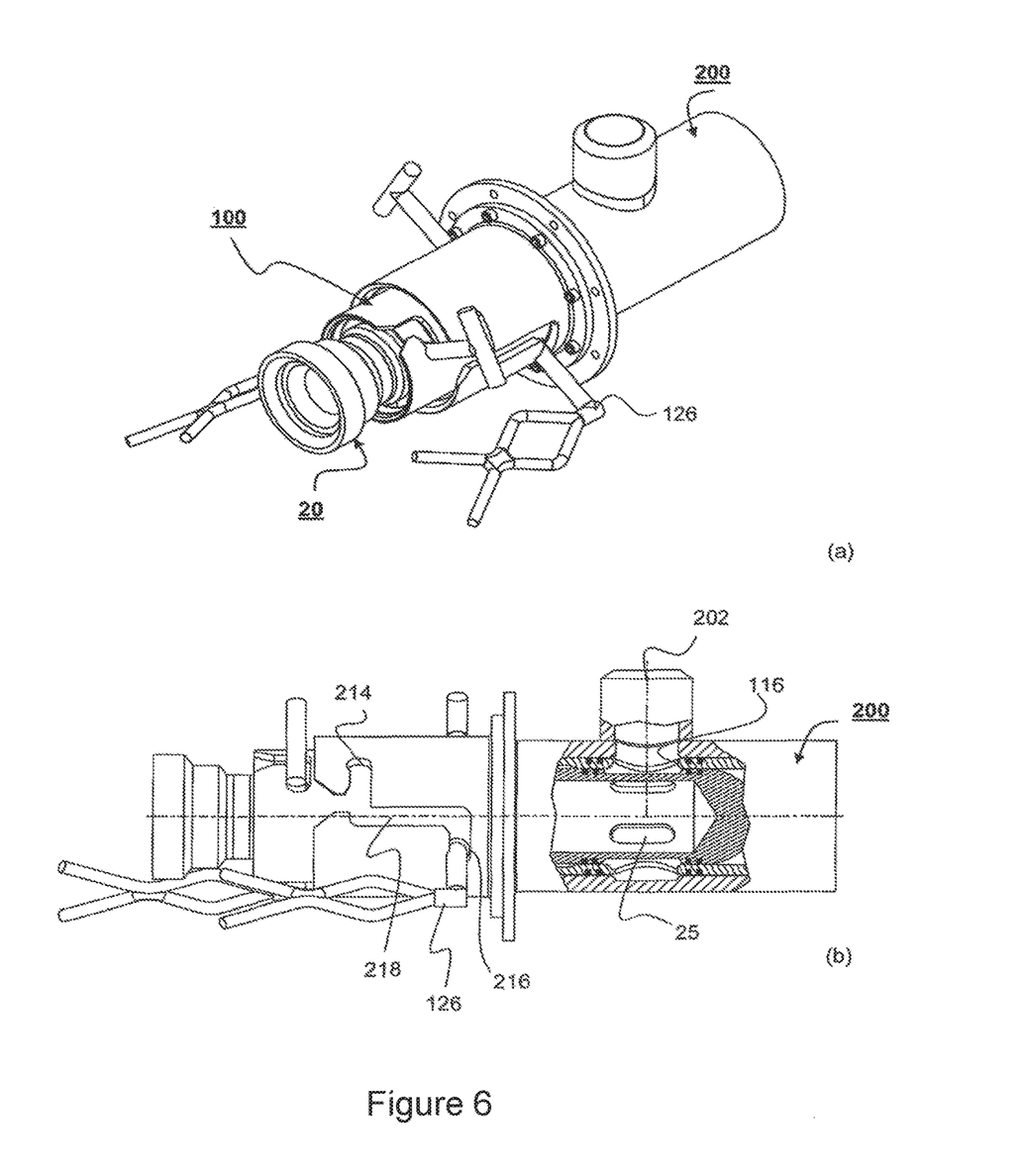
FIG. 6 shows the assembly of FIG. 5, (a) in a perspective view and (b) in a partially sectioned side view, when the stab connector is in its flow position.

FIGS. 5 and 6 show the assembled connection of the "standard" stab connector 20 inserted and secured in the stab connector 100 of the preferred embodiment, which is deployed in the receptacle 200 forming a controllable fluid path connection between the two reservoirs (not shown).

In particular, the "standard" stab connector handle 28 is locked in the J-slot 124 of the stab connector 100, which is secured within the receptacle 200 with the handle portion 126 in engagement with the J-slot 212.

In operation, the ROV grabs the handle portion 126 of the stab connector 100 and inserts the stab connector 100 into the central cavity 206 of the receptacle 200 by guiding the handle portion 126 into the J-slot 212 and locking it into the sealing position 214. Once locked in position, the sealing portion 110 sealingly engages the outlet port 202 of the receptacle 200 sealing the fluid path of the outlet port 202. The receptacle 200 is now operational for use with matching "standard" stab connectors 20.

In order to establish a fluid connection between two reservoirs using a "standard" stab connector 20, the ROV engages the handle portion 28 and inserts the "standard" stab connector 20 into the central bore 108 of the stab connector 100/receptacle 200 assembly and guides the handle 28 into the J-slot of the stab connector 100 securing the "standard" stab connector 20.

The two reservoirs are now physically connected with the fluid path closed by the sealing portion 110 of the stab connector 100. In order to open the fluid path, the ROV engages the handle portion 126 and moves it from the sealing position 214 (FIG. 5 (b)) into the flow position 216 (FIG. 6 (b)) by guiding the handle portion 126 along the transitional position 218 of the J-slot 212. In the flow position 216, the stab connector port openings 25 of the "standard" stab connector 20, the exit port openings 116 of the stab connector 100 and the outlet port 202 of the receptacle 200 are aligned so as to form an open fluid path between the two reservoirs (not shown).

At the end of the fluid exchange between the two reservoirs, the fluid flow can be simple terminated by moving the handle 126 back into its sealing position 214 of the J-slot 212. The "standard" stab connector 20 can then be disengaged from the stab connector 100 without any risk of leakage from the subsea reservoir since the sealing portion 110 seals the outlet port 202 of the receptacle 200.

Alternatively, the "standard" stab connector 20 may be retro-fitted to the stab connector 100 of the present invention before establishing a connection between the two fluid reservoirs (not shown). This provides the advantage that the ROV only has to engage the handle portion 126 of the stab connector assembly 20, 100 to simultaneously deploy the stab connector assembly 20, 100 in the receptacle 200 and control the fluid flow between the two reservoirs. Thus, there is no need to manipulate different parts of the connection.

Figure 7:
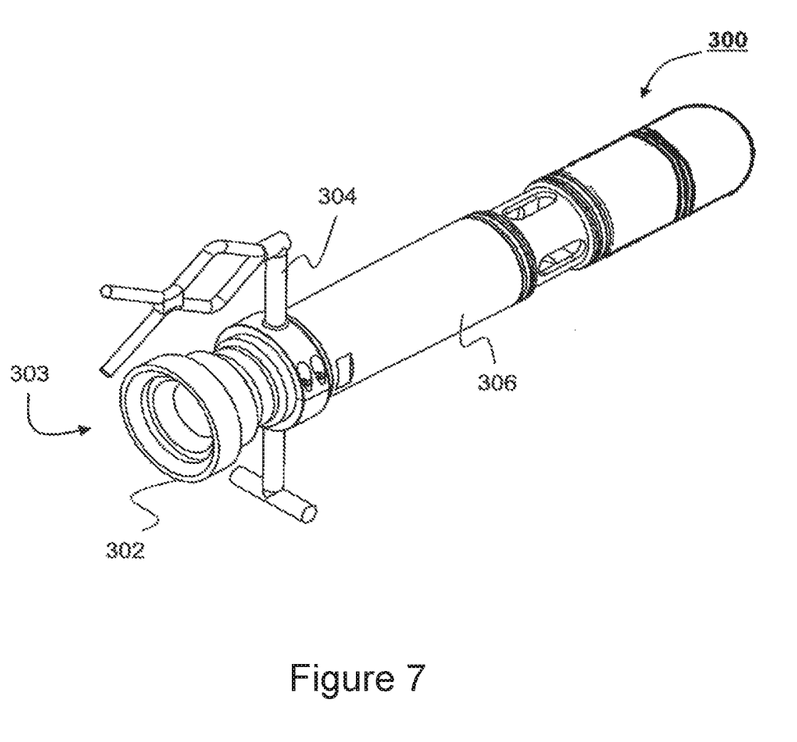
FIG. 7 shows an alternative stab connector of the present invention suitable to be directly connected to a hose.

FIG. 7 depicts a first alternative embodiment of the present invention, where the stab connector 300 is a single unit connectable to a hose. In particular, the stab connector 300 resembles the stab connector 100 of the preferred embodiment. However, stab connector 300 is not retro-fittable to a "standard" stab connector 10, but includes a hose flange portion 302 at the proximal end portion 303 instead of the "open" flange portion of the preferred embodiment, so that it can be directly connected to a hose (not shown). All other parts are the same, or alike, in order to provide the same functionality as the stab connector 100.

In operation, the ROV or diver, simply engages the handle portion 304, inserts the stab body 306 into a receptacle, such as receptacle 200, and guides the handle portion 304 into the J-slot 212 of the receptacle 200, where the stab connector 300 can be selectively moved between a sealing position and a flow position (see preferred embodiment).

Referring now to FIGS. 8 to 11, another alternative embodiment of the present invention is depicted, where a stab connector 400 is provided for a flooding receptacle 500 to selectively control the fluid flow through an outlet port 502 of the receptacle 500. This particular connection may be used for flooding a reservoir (not shown).

Figure 8:
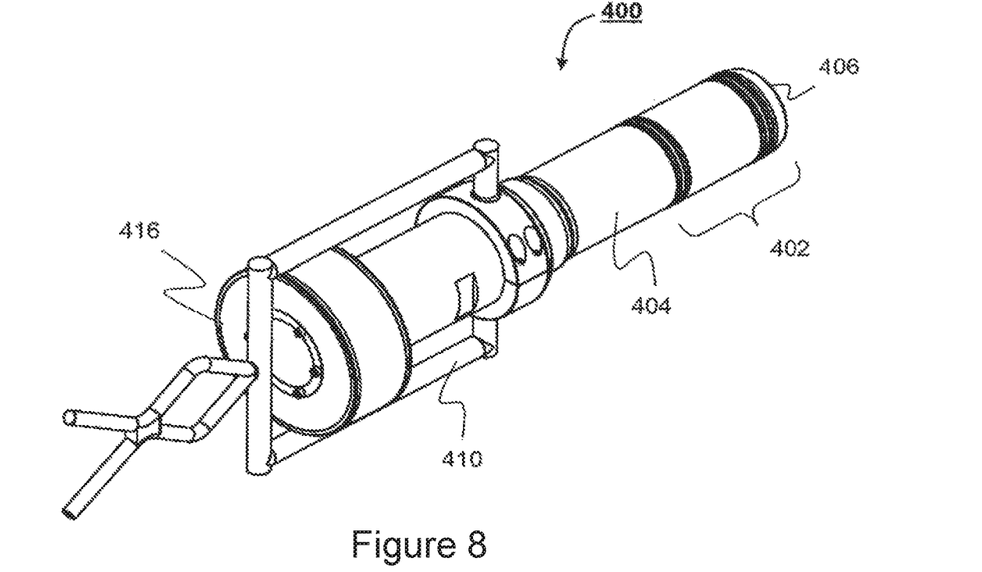
FIG. 8 shows a stab connector of the second arrangement of the first aspect of the present invention.
Figure 9:
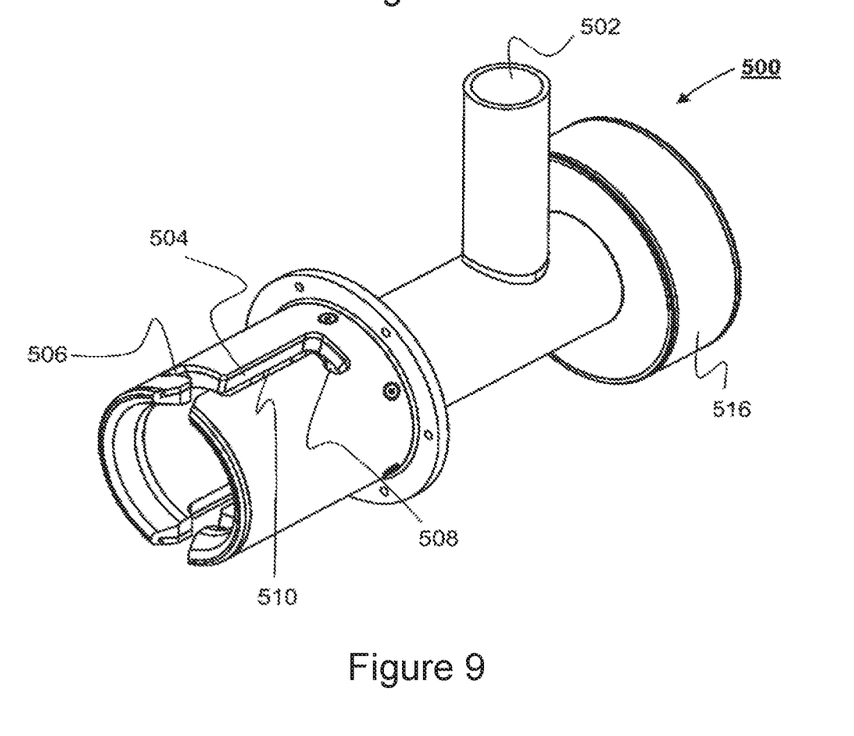
FIG. 9 shows a flooding receptacle suitable to receive the stab connector of FIG. 8.

In particular, the stab connector 400 includes an elongated tubular stab body 404 having a sealing portion 402 at a distal end portion 406. The stab connector 400 further includes a handle portion 410 configured to engage a J-slot 504 (see receptacle 200 of the preferred embodiment) of the receptacle 500 so as to be locked into any one of a flow position 506, where the sealing portion 402 is moved away from the outlet port 502 as shown in FIG. 11, a sealing position 508, where the sealing portion 402 is aligned with the outlet port 502 so as to seal the fluid path through the outlet port 502 as shown in FIG. 10, and a transitional position 510 therebetween.

The tubular stab body 404 includes a throughbore 412 configured so that fluid from the subsea reservoir can flow from the outlet port 502 through the stab body 404 into the surrounding environment, or vice versa.

Figure 10:
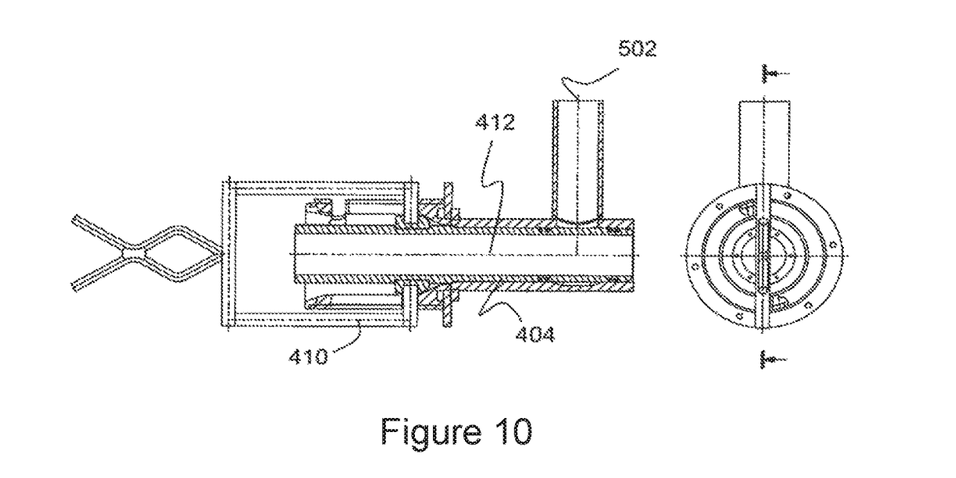
FIG. 10 shows respective sectioned side view and front view of the assembly of the stab connector of FIG. 8 and the receptacle of FIG. 9 when the stab connector is in the sealing position.
Figure 11:
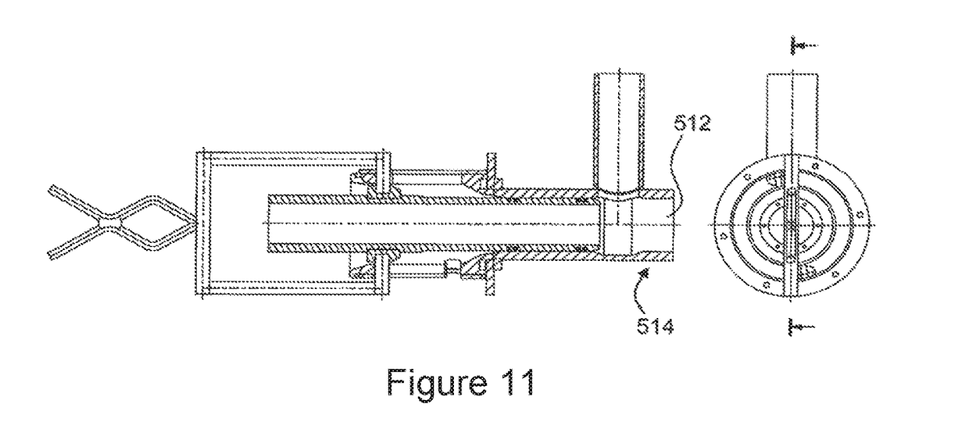
FIG. 11 shows respective sectioned side view and front view of the assembly of the stab connector of FIG. 8 and the receptacle of FIG. 9 when the stab connector is in the flow position.

In operation, the stab connector 400 is operatively engaged with the receptacle 500 so that the handle portion 410 is initially placed in the sealing position 508 of the J-slot 504 (FIG. 10). In order to flood the subsea reservoir (not shown), an ROV or diver engage the handle portion 410 of the stab connector 400 and move the handle portion 410 out of the sealing position, through the transitional position 510 and into the flow position 506 (FIG. 11). When the stab connector 400 is in the flow position 506, fluid can flow out of the outlet port 502 and into the surrounding environment, either through the stab body 404, or directly through an opening 512 at a distal end 514 of the receptacle 500. The distal opening 512 of the receptacle 500 may be coupled to a first filter 516 and/or the proximal end 414 of the throughbore 412 of the stab body 404 may be coupled to a second filter 416. The filter 416 and 510 may be a mesh, sieve or perforated disc. However, it is understood by the skilled person in the art that any other suitable filter means may be used instead.

In order to terminate the fluid flow through the outlet port 502, the stab connector 400 is simply moved back into its sealing position 508 sealing the outlet port 502 of the receptacle 500.

It will be appreciated by persons skilled in the art that the above embodiments have been described by way of example only and not in any limitative sense, and that various alterations and modifications are possible without departing from the scope of the invention as defined by the appended claims.

The invention claimed is:

1. A stab connector for providing a fluid flow path between a first fluid reservoir and a second fluid reservoir, comprising a stab body coupleable to a receptacle in fluid communication with the second fluid reservoir via an outlet port, wherein the stab body comprises:
   a first sealing portion, comprising a first sealing member spaced apart from a second sealing member by a distance greater than a width of the outlet port; and
   a second sealing portion, comprising at least one first opening located between a third sealing member and a fourth sealing member, the third and fourth sealing members being separated by a distance greater than the width of the outlet port; and
   wherein the whole stab body is moveable relative to the receptacle to move the stab body inside said receptacle between:
   a sealing position, in which fluid flow in the fluid flow path between the first fluid reservoir and the second fluid reservoir is prevented by the first sealing portion of the stab body, and
   a flow position, in which the fluid flow in the fluid flow path between the first fluid reservoir and the second fluid reservoir is permitted by the second sealing portion of the stab body,
   wherein the stab body has an engaging member adapted to lock said stab body in said sealing position and said flow position.

2. A stab connector according to claim 1 wherein said stab body is an elongate member having a proximal end portion adapted to be fluidly coupled to the first reservoir and a distal end portion adapted to be received by the receptacle.

3. A stab connector according to claim 2, wherein said stab body further comprises a throughbore providing a fluid passageway, and wherein the at least one first opening is at said distal end portion and a second opening is at said proximal end portion.

4. A stab connector according to claim 3, wherein said at least one first opening is coupleable in fluid communication with the receptacle, and wherein said second opening is coupleable in fluid communication with the first fluid reservoir.

5. A stab connector according to claim 3, wherein said throughbore is adapted to provide fluid communication between the first reservoir and the second reservoir when said stab body is in said flow position.

6. A stab connector according to claim 1, wherein the receptacle has a multi-position slot, and wherein the engaging member is located in a first slot of the multi-position slot to lock the stab body in the sealing position, and wherein the engaging member is located in a second slot of the multi-position slot to lock the stab body in the flow position.

7. A stab connector according to claim 6, wherein said engaging member is adapted to lock said stab body in a transitional position between said sealing position and said flow position.

8. A stab connector according to claim 7, wherein said transitional position is a partly open flow position.

9. A stab connector according to claim 6, wherein said stab body is an elongate member having a proximal end portion adapted to be fluidly coupled to the first fluid reservoir and a distal end portion adapted to be received by the receptacle, and wherein said engaging member is located at said proximal end portion of said elongate member.

10. A stab connector according to claim 6, wherein said engaging member comprises a handle portion adapted to be manipulated by a remotely operated vehicle.

11. A stab connector according to claim 1, wherein said stab body is a sleeve engageable with a variety of stab connectors and comprising a throughbore providing a fluid passageway, and wherein the assembly of said stab body and said variety of stab connectors are moveable inside the receptacle between said sealing position and said flow position.

12. A stab connector according to claim 11, wherein said stab body further comprises a stab engaging flange adapted to operatively engage said variety of stab connectors and said stab body.

13. A stab connector according to claim 12, wherein the stab engaging flange has a single-position slot configured to lock the variety of stab connectors to the stab body.

14. A stab connector according to claim 11, wherein said engaging member is located at said proximal end portion of said elongate member.

15. A stab connector according to claim 11, wherein said engaging member comprises a handle portion adapted to be manipulated by a remotely operated subsea vehicle.

16. A stab connector according to claim 1, wherein the second sealing member provides the function of the third sealing member.

* * * * *